United States Patent
Tava

(10) Patent No.: US 10,871,375 B2
(45) Date of Patent: Dec. 22, 2020

(54) METHOD FOR OPERATING A NAVIGATION SYSTEM

(71) Applicant: Bayerische Motoren Werke Aktiengesellschaft, Munich (DE)

(72) Inventor: Marcello Tava, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 164 days.

(21) Appl. No.: 16/133,488

(22) Filed: Sep. 17, 2018

(65) Prior Publication Data

US 2019/0017830 A1    Jan. 17, 2019

Related U.S. Application Data

(63) Continuation of application No. PCT/EP2017/053822, filed on Feb. 21, 2017.

(30) Foreign Application Priority Data

Mar. 18, 2016    (DE) .................. 10 2016 204 522

(51) Int. Cl.
*G01C 21/26* (2006.01)
*G01C 21/20* (2006.01)
(Continued)

(52) U.S. Cl.
CPC ......... *G01C 21/20* (2013.01); *G01C 21/3453* (2013.01); *G01C 21/3484* (2013.01);
(Continued)

(58) Field of Classification Search
USPC ................................................. 701/400–541
See application file for complete search history.

(56) References Cited

U.S. PATENT DOCUMENTS 5,610,821 A * 3/1997 Gazis ................. G01C 21/3492
340/990
7,526,377 B2 * 4/2009 Wiener .................. G01C 21/32
701/117
(Continued)

FOREIGN PATENT DOCUMENTS

DE        103 25 424 A1      12/2004
DE   10 2008 037 120 A1       4/2009
EP         2 270 764 A1       1/2011

OTHER PUBLICATIONS

PCT/EP2017/053822, International Search Report dated May 10, 2017 (Two (2) pages).

(Continued)

*Primary Examiner* — Jonathan L Sample
(74) *Attorney, Agent, or Firm* — Crowell & Moring LLP

(57) ABSTRACT

A method for operating a navigation system of a vehicle includes providing one or more dedicated route options, transmitting a first signal for requesting one or more route options to a vehicle-external data processing device, and receiving a second signal from the vehicle-external data processing device, where the second signal identifies one or more route options provided by the vehicle-external data processing device for route calculation. The method also includes outputting at least one of the dedicated route options and at least one of the route options identified in the second signal, and detecting at least one input of a user of the navigation system corresponding to a selected one of the outputted route options. If the selected route option is one of the route options identified in the second signal, the method includes transmitting a third signal that identifies the selected route option to the vehicle-external data processing device, and receiving a fourth signal from the vehicle-external data processing device identifying a route assigned to the selected route option and calculated by the vehicle- (Continued)

external data processing device. If the selected route option is one of the dedicated route options, the method also includes calculating a route assigned to the selected route option, and outputting the calculated route.

19 Claims, 3 Drawing Sheets

(51) Int. Cl.
*G01C 21/34* (2006.01)
*G06F 16/9537* (2019.01)
*G06F 16/29* (2019.01)
*G01C 21/36* (2006.01)

(52) U.S. Cl.
CPC .............. *G01C 21/36* (2013.01); *G06F 16/29* (2019.01); *G06F 16/9537* (2019.01)

(56) References Cited

U.S. PATENT DOCUMENTS

| | | | | |
|---|---|---|---|---|
| 7,546,206 B1* | 6/2009 | Miller | G01C 21/00 | 701/120 |
| 8,190,362 B2* | 5/2012 | Barker | G08G 1/0962 | 701/414 |
| 9,209,914 B2* | 12/2015 | Reed | H04W 24/06 | |
| 2003/0060973 A1* | 3/2003 | Mathews | G01C 21/26 | 701/410 |
| 2004/0030493 A1* | 2/2004 | Pechatnikov | G01C 21/3667 | 701/411 |
| 2009/0048775 A1* | 2/2009 | Okude | G01C 21/3446 | 701/533 |
| 2010/0057340 A1* | 3/2010 | Kravets | G01C 21/3484 | 701/416 |
| 2010/0250114 A1* | 9/2010 | Chikamori | G01C 21/3461 | 701/533 |
| 2010/0332113 A1* | 12/2010 | Tengler | G01C 21/3469 | 701/123 |
| 2011/0224898 A1* | 9/2011 | Scofield | G08G 1/052 | 701/532 |
| 2012/0191290 A1* | 7/2012 | Bourque | G06Q 10/047 | 701/29.1 |
| 2014/0005924 A1* | 1/2014 | Letz | G01C 21/3484 | 701/424 |
| 2014/0012502 A1* | 1/2014 | Joshi | G01C 21/3453 | 701/533 |
| 2014/0032087 A1* | 1/2014 | Shiri | G01C 21/3469 | 701/117 |
| 2014/0309864 A1* | 10/2014 | Ricci | G05D 23/1917 | 701/36 |
| 2016/0109252 A1* | 4/2016 | Caine | G06Q 30/02 | 701/533 |
| 2016/0305792 A1* | 10/2016 | Funakoshi | G01C 21/3676 | |

OTHER PUBLICATIONS

German Search Report issued in German counterpart application No. 10 2016 204 522.9 dated Nov. 16, 2016, with Statement of Relevancy (Ten (10) pages).
Wendel, "Google Maps 'soon' with offline navigation", URL: httn://www.apfeltalk.de/magazin/2015/11/10/google-maps-bald-mit-offline-navagation/, Nov. 10. 2015, three(3)pages, with English translation.
German-language European Office Action issued in European application No. 17 706 243.7-1001 dated Mar. 12, 2020 (Nine (9) pages).

* cited by examiner

METHOD FOR OPERATING A NAVIGATION SYSTEM

CROSS REFERENCE TO RELATED APPLICATIONS

This application is a continuation of PCT International Application No. PCT/EP2017/053822, filed Feb. 21, 2017, which claims priority under 35 U.S.C. § 119 from German Patent Application No. 10 2016 204 522.9, filed Mar. 18, 2016, the entire disclosures of which are herein expressly incorporated by reference.

BACKGROUND AND SUMMARY OF THE INVENTION

The present invention relates to a method for operating a navigation system of a vehicle, and to a navigation system for a vehicle.

Navigation systems of this type enable a user of the vehicle to instigate the calculation of a route from a start to a destination and, in particular during the journey from the start to the destination, to obtain navigation indications, for instance instructions for turning off or instructions in the case of deviations from the planned route. For this purpose a navigation system usually has a positioning system that allows the current spatial position of the vehicle to be determined. The start and the destination are also usually specified as spatial positions, which is typically done firstly by ascertaining the current spatial position as a start position and secondly by specifying a specific address as a destination. Map data, for instance a road network, can be used for calculating the route. Said data can be stored in the navigation system or externally, wherein the calculation can also be carried out internally, that is to say in the navigation system, or externally. The calculation of the route constitutes an optimization problem. Consequently, in this case different optimization criteria can be used or weighted differently. The choice of an optimization criterion can relate in particular to the selection of a route whose route length or calculated travel time is optimized.

U.S. Pat. No. 9,209,914 B2 discloses a navigation system comprising a server system having a first cartographic database and a first route calculation module, and also a mobile appliance having a geopositioning means having a second cartographic database and a second route calculation module. In this case, the mobile appliance transmits a route inquiry to the remote server system, and the server system calculates a first route from the current position to the destination point. The first route has a list of maneuvering points and a list of path points which are situated on the first route and are at a distance from the maneuvering points. The second route calculation module generates a second route on the basis of the path points and the second cartographic database.

U.S. Pat. No. 5,610,821 discloses a system for providing a centrally coordinated, very general route system. The latter allocates traffic routes in such a way as to provide an optimum stability of the traffic system. The system comprises fixed computers that can communicate seamlessly with all vehicles in a region, and vehicle computers. In this case, the system is interactive by virtue of the fact that the fixed computers receive data, for instance the desired route, position or the time required for traveling through a segment, from the vehicle components and determine the system-related optimum route and transmit it to the vehicles.

An object of the invention is to increase the performance scope of a navigation system in particular with regard to the functional scope, user convenience, operational reliability and/or the quality of the route calculation.

A first aspect of the invention relates to a method for operating a navigation system, comprising the following method steps. A first method step involves providing one or more dedicated route options specific to the navigation system. A further method step involves transmitting a first signal for requesting one or more route options to a vehicle-external data processing device. In a further method step, the navigation system receives a second signal from the vehicle-external data processing device, said second signal identifying one or more route options provided by the vehicle-external data processing device for route calculation. A further method step involves outputting at least one of the dedicated route options and at least one of the route options identified in the second signal by means of an output unit of the navigation system. In a further method step, the navigation system detects at least one input of a user of the navigation system for selecting one of the route options output. If the selected route option is one of the route options identified in the second signal, in a further method step a third signal is transmitted to the vehicle-external data processing device, said third signal identifying said selected route option, and in yet another method step, a fourth signal is received, which has been transmitted by the vehicle-external data processing device and identifies a route assigned to the selected route option and calculated by the vehicle-external data processing device. If the selected route option is one of the dedicated route options, the navigation system calculates a route assigned to this route option. A further method step involves outputting the calculated route by means of an output unit of the navigation system.

A "navigation system" within the meaning of the invention should be understood to be a device which enables the calculation of a route from a start to a destination. Preferably, the navigation system comprises a positioning system, for instance a receiver for a satellite navigation system such as GPS, Galileo or GLONASS. Preferably, the start and/or the destination are/is specified as a spatial position, and in particular the start is determined as the current spatial position by means of the positioning system. In the case of a navigation system within the meaning of the invention, the route is calculated taking account of one or more optimization criteria that can be weighted differently.

In this case, the optimization criteria are applied and/or weighted depending on a route option, chosen for instance by a user of the navigation system. Such a route option can concern in particular the optimization with regard to the travel time, the length, the energy efficiency of the route. The optimization with regard to a route which scenically is particularly beautiful or interesting is also conceivable. In particular, a route option within the meaning of the invention can combine a plurality of optimization criteria and/or the weighting thereof, in order to permit for the user a limited and thus manageable selection of possible routes from a start to a destination.

A "vehicle" within the meaning of the invention should be understood to be any type of vehicle that can be used to transport one or more persons and/or load. Preferably, the vehicle is a land vehicle, which moves only or predominantly on land. In particular, an automobile, a truck, a motor cycle, a bus or a trailer attached to one of the vehicles mentioned above is a vehicle within the meaning of the invention. Moreover, within the meaning of the invention, a vehicle which is moved by mechanical power and in particular has an engine is designated as motor vehicle.

With the solution according to the invention, the dedicated route options provided by the navigation system can be supplemented by further route options that are provided by the vehicle-external data processing device. In particular, said further route options can be supplemented without the need for intervention in the navigation system, for instance in the form of an update for the vehicle by a workshop. This is more convenient in particular for a user of the navigation system, for instance a driver of the vehicle. In this regard, the additional route options provided by the vehicle-external data processing device are dynamically available to the user and can also be adapted more quickly since this adaptation only has to be carried out at the vehicle-external data processing device.

Moreover, it is possible to reduce the demand for computing power at the vehicle-external data processing device since only that route which has actually been selected by means of the corresponding route option is calculated. In this regard, a large number and/or diversity of possible route options and thus routes can be provided.

Preferred embodiments and developments of the method for operating a navigation system are described below, which can be combined arbitrarily with one another in each case, insofar as this is technically possible and not expressly excluded.

In accordance with a first preferred embodiment, the method furthermore comprises the following step: providing one or more predetermined filter criteria. One advantage of this may reside in the fact that a possibly large number of route options can be filtered, that is to say in particular limited, on the basis of the filter criteria. This enables a user to filter out from the route options those which are particularly relevant to the user.

In accordance with a further preferred embodiment of the method for operating a navigation system, during the process of transmitting the first signal, at least one of the predetermined filter criteria is transmitted to the vehicle-external data processing device. This enables a preselection of the route options provided by the vehicle-external data processing device and identified in the second signal. In this way, route options which do not pass the at least one predetermined filter criterion can be filtered out beforehand. In this regard, in the navigation system and/or in the vehicle-external data processing device, the required computing power can be reduced and/or the transferred volume of data of the second signal can be reduced.

In accordance with a further preferred embodiment, the method furthermore comprises the following steps. In a further method step of this embodiment, the navigation system provides an input option for selecting at least one of the predetermined filter criteria by means of a user and detects an assigned input of the user. In a further method step, if at least one filter criterion has been selected, the latter is identified as an external filter criterion. In this preferred embodiment, only such filter criteria which are identified as external filter criteria are transmitted to the vehicle-external data processing device. In particular, one or more of the predetermined filter criteria can relate to personal data. An improved protection of the personal data can be achieved in this way. Moreover, this enables the user himself/herself to select which data the user classifies as particularly worthy of protection and which are thus not intended to be transmitted to the vehicle-external data processing device. In addition, the user can select, in particular, which of the predetermined filter criteria are transmitted as external filter criteria to the vehicle-external data processing device in order to enable for the latter a preselection of the route options provided by it.

In accordance with a further preferred embodiment, the method furthermore comprises the following method step: locally filtering the dedicated route options or the route options identified in the second signal on the basis of at least one of the predetermined filter criteria by means of a data processing unit of the navigation system. In this preferred embodiment, only the filtered route options are output by means of the output unit of the navigation system. In principle, at least one of the dedicated route options and also at least one of the route options identified in the second signal are output during this outputting. However, it is possible that on account of locally filtering in the case of the filtered route options no dedicated route options or no route options identified in the second signal are available for the outputting. In this case, locally filtering should be understood as a part of the method step of outputting the route options. In this case, both at least one dedicated and at least one of the route options identified in the second signal are taken into account during the local filtering and thus output in this sense. One advantage of this preferred embodiment can reside in enabling the filtering to be carried out locally, that is to say in the navigation system. In particular, in this way the route options can be filtered on the basis of at least one of the predetermined filter criteria, without this filter criterion being transmitted externally, i.e. in particular to the vehicle-external data processing device.

In accordance with a further preferred embodiment, the method furthermore comprises the following steps. In a further method step, the navigation system provides an input option for selecting at least one of the predetermined filter criteria and detects an input assigned to said input option. In a further method step, if at least one filter criterion has been selected, the latter is identified as an internal filter criterion. In this case, in this embodiment, the process of locally filtering is carried out only on the basis of such filter criteria which are identified as internal filter criteria. In this advantageous way, this makes it possible to select at least one of the predetermined filter criteria which is used for locally filtering. Conversely, it is possible for other filter criteria from among the predetermined filter criteria to be excluded from locally filtering. In particular, a user can preselect the subsequently output route options by way of the at least one internal filter criterion and thus reduce the number of route options output and/or adapt the latter to the user's respective requirement. In this regard, data protection control is implemented, which is preferably user-configurable. Finally, the route determination quality can be increased since only those routes which have been previously selected by means of the internal filter criteria are output by way of the respective route options for the selection.

In accordance with a further preferred embodiment of the method for operating a navigation system, at least one of the predetermined filter criteria identifies a technical property of the vehicle. Such filter criteria or technical properties of the vehicle can be, in particular: the registration of the vehicle, the vehicle type for instance sports car, cabriolet, cross-country vehicle or transporter, the number of occupants, the weight of the vehicle, the vehicle load, the tires used, the amount of energy available for the drive for instance the tank filling level, the type of drive for instance all-wheel drive, front-wheel drive or rear-wheel drive, and/or information about whether a trailer is attached to the vehicle and, if so, optionally the kind or type of trailer. In this regard, the route options output can be adapted to the technical properties of the vehicle.

In accordance with a further preferred embodiment of the method, in a further method step at least one of the predetermined filter criteria is received, preferably from the vehicle, by means of a communication interface of the navigation system. In this advantageous way, predetermined filter criteria can be provided without the need for a user to intervene or make an input for this purpose. This can in particular also increase the operational reliability and/or the quality of a route which is calculated later and which is based on the selection of an assigned route option.

In accordance with a further preferred embodiment of the method for operating a navigation system, at least one of the predetermined filter criteria is based on a use history. In this advantageous way, the route options can be filtered depending on the previous inputs of the user. In this regard, particularly preferred route options can be recognized, for instance those which have been selected particularly often, and made available to the user as filter criterion.

In accordance with a further preferred embodiment of the method, in a further method step an input option for voice selection is provided. In a further method step, the input of the voice selection is detected and stored. In this embodiment, the voice-based outputs are adapted to the selected operating language. In particular, the voice selection can also be implemented during the production of a navigation system which is operated by a method in accordance with the embodiment. Alternatively or additionally, the voice selection can be implemented by a user. In this advantageous way, it is possible to increase the user convenience and/or adapt a voice-based output.

In accordance with a further preferred embodiment of the method for operating a navigation system, the latter provides a use history. In particular, the latter is generated on the basis of previous inputs of one or more users for selecting route options. Preferably, the user history is generated via one or more iterations of the method for operating a navigation system and specifically outputting the route options and detecting at least one input of the user for selecting one of the route options output and/or is extended by an identification of the respective input. In a first preferred variant of this embodiment, in this case the number of the selection of a specific route option is stored in the use history and thereupon provided. In an alternative or additional variant of this embodiment, the frequency of the selection of a specific route option over a predetermined time period is determined and thereupon provided. In an additional or alternative variant of this embodiment, the chronological order of the selection of specific route options is stored in the use history and thereupon provided. In this advantageous way, this makes it possible to provide predetermined filter criteria which reflect which route options have been selected particularly frequently, particularly often and/or in a specific time period. This enables a user then to filter the route options in respect of those which the user particularly prefers, at least with regard to the selection thereof.

In accordance with a further preferred embodiment, the method furthermore comprises the following steps. A further method step involves detecting at least one input of the user which indicates a confirmation or rejection of the assignment of the calculated route to the selected route option. If the selected route option is one of the route options identified in the second signal, a further method step involves transmitting a fifth signal to the vehicle-external data processing device, said fifth signal identifying the confirmation or rejection of the assignment of the calculated route to the selected route option. In an alternative or additional further method step, wherein the navigation system provides a use history, the navigation system stores an identification in the use history about the confirmation or rejection of the assignment of the calculated route to the selected route option. The assignment can be adapted on the basis thereof. In particular, in this case, in one preferred variant of this embodiment, the navigation system can provide a predetermined filter criterion which characterizes one or more identifications—stored in the use history of the respective confirmation or rejection about the assignment between route option and calculated route. In this regard, for instance, particularly conveniently for the user, it is possible to filter out those route options whose assignments to the respectively calculated route have been rejected by the user.

In accordance with a further preferred embodiment of the method for operating a navigation system, by means of the second signal in the case of at least one of the route options provided by the vehicle-external data processing device, assigned route-related data are transferred. During the process of outputting this route option, the content of said route-related data is output at least partly by means of the output unit. In this way, information about the respective route option can be transferred and the navigation system can output this information or at least part thereof. In particular, such data can comprise a route name and a route description, which can be output.

In accordance with one preferred variant, the name and/or the short description of the route option are/is output in the selected and stored operating language by the vehicle-internal navigation system provided that the content of the route-related data of the second signal contains the respective contents in the selected language. Otherwise the outputting is effected in the language in which the respective part of the content is present. If the respective part of the content is present in a plurality of languages, but not in the selected language, in one preferred variant the outputting is effected in a default language, for instance English or Korean. Additionally or alternatively, the route option is presented by means of a graphical representation, preferably an icon.

This enables a user to obtain an overview of the possible route options, for instance on the basis of the route names, and additional information about the respective route option, for instance on the basis of the route descriptions. Moreover, such data can comprise in particular a route identifier, which can serve as identification of the route option in the third signal. Provided that the route names or the route descriptions are unambiguously assigned to a specific route to be calculated, these can also serve as identification of the route option or as route identifier.

Within the meaning of the invention, "a first signal" and "a further first signal" relate in each case to such a signal which corresponds to the first signal in accordance with the first aspect of the invention in its type. In particular, a further first signal can be transmitted in addition to the first signal by the navigation system to the vehicle-external data processing device or to a further vehicle-external data processing device. Furthermore, the first signal can also be transmitted by a vehicle-external system, for instance in order to request a route option for the vehicle or the navigation system thereof by means of the vehicle-external system.

This correspondingly also applies to "a second signal", "a further second signal", "a third signal", "a further third signal", "a fourth signal" and a "a further fourth signal".

In accordance with a further preferred embodiment, the method furthermore comprises the following steps. In a further method step, the navigation system transmits a further first signal to a further vehicle-external data processing device. In a further method step, the navigation system receives a further second signal from the further vehicle-external data processing device. Furthermore at least one of the route options identified in the further second signal is output during the process of outputting the route options and a selection of said route option is thus made possible. In a further method step, if the selected route option is one of the route options identified in the further second signal, the navigation system transmits a further third signal to the further vehicle-external data processing device and receives from the latter, in yet another method step, a further fourth signal. In this advantageous way, at least two vehicle-external data processing devices, namely the vehicle-external data processing device and the further vehicle-external data processing device, can be utilized for providing route options and respectively calculating the respectively assigned routes. In particular, the quality and/or the selection of possible routes can be increased with this extended functional scope. In this regard, for instance, one of the at least two vehicle-external data processing devices can achieve particularly good results in particular during the provision of route options and the calculation of the assigned routes which are intended to be scenically beautiful or interesting, while the other vehicle-external data processing device achieves particularly good results with regard to the fastest or shortest route.

In a first preferred variant of this embodiment, which also provides a use history, the fact of which of the at least two vehicle-external data processing devices has provided the respectively selected route option is stored in particular in said use history. In this advantageous way, the route options can be filtered by means of a corresponding filter criterion, which is based in particular on the respectively achieved results of the vehicle-external data processing devices during the provision and calculation of the route options or routes, with the aid of the vehicle-external data processing devices.

In accordance with a further preferred embodiment of the method, a further method step involves determining one or more available vehicle-external data processing devices by means of a data memory which stores the respectively available vehicle-external data processing device(s). In this case, the navigation system or a vehicle-external data processing unit, in particular the vehicle-external data processing device, can comprise said data memory. In this regard, it is possible to realize an efficient (i.e. without updating the navigation system) adaptability of the vehicle-internal system with regard to the capability of conferring a route calculation task of the vehicle-external data processing devices and the capability of providing new vehicle-external data processing devices, in particular even without inputting of the respective vehicle-external data processing device by the user.

In accordance with a further preferred embodiment of the method, a further method step involves outputting the vehicle-external data processing device or the available vehicle-external data processing devices by means of the output unit. In one preferred variant, the outputting is effected by means of displaying the respective name of the vehicle-external data processing device and/or by means of displaying a short description of the respective optimization criterion, for instance journey time, route length, toll costs. Additionally or alternatively, the outputting is effected by means of an icon that identifies the respective vehicle-external data processing device. In this advantageous way, it is possible to increase the user convenience and/or to present the vehicle-external data processing device in the vehicle-internal navigation system and/or in a manner integrated with the latter.

In accordance with a further preferred embodiment of the method for operating a navigation system, wherein the latter stores and provides map data, said method furthermore comprises the following method step: comparing the calculated route with the map data. In particular, the operational reliability can thus be increased since, in particular, erroneous routes which cannot be reconciled with the map data can be identified as such.

In accordance with a further preferred embodiment of the method, during the process of outputting the calculated route, the latter is overlaid over the map data stored in the navigation system. In this regard, an increased user convenience can be achieved.

In accordance with a further preferred embodiment, the method furthermore comprises the following step: recognizing the user of the navigation system or the driver of the vehicle. In this preferred embodiment, the predetermined filter criteria are provided at least partly in a user-specific manner. In particular such predetermined filter criteria which relate to the use history are provided in a user-specific manner. Moreover, the selection and identification as internal or external filter criterion can be user-specific. In addition, data about the respective user, for instance the user's permission to drive on certain roads or a certain terrain, the user's health status or the user's sensitivity to travel sickness, can be provided as predetermined filter criteria, preferably as internal filter criteria. An improved user convenience and/or an increased operational reliability can be achieved in this way.

A second aspect of the invention relates to a computer program, in particular for a navigation system, comprising a program code for carrying out a method in accordance with the first aspect of the invention. The embodiments and developments and also possible advantages of the first aspect of the invention as already mentioned above correspondingly also apply to the computer program according to the invention.

A third aspect of the invention relates to a navigation system for a vehicle and in particular for a motor vehicle, which is configured to perform a method in accordance with the first aspect of the invention.

Within the meaning of the invention "configured" should be understood such that the corresponding device is already set or settable i.e. configurable to fulfil a specific function. In this case, the configuration can be effected for example via a corresponding setting of parameters of a process sequence or of switches or the like for activating functionalities or settings.

The embodiments and developments and also possible advantages of the first aspect of the invention as already mentioned above correspondingly also apply to the navigation system according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

Further advantages, features and application possibilities of the present invention are evident from the following detailed description in association with the figures.

DETAILED DESCRIPTION OF THE DRAWINGS

Figure 1:
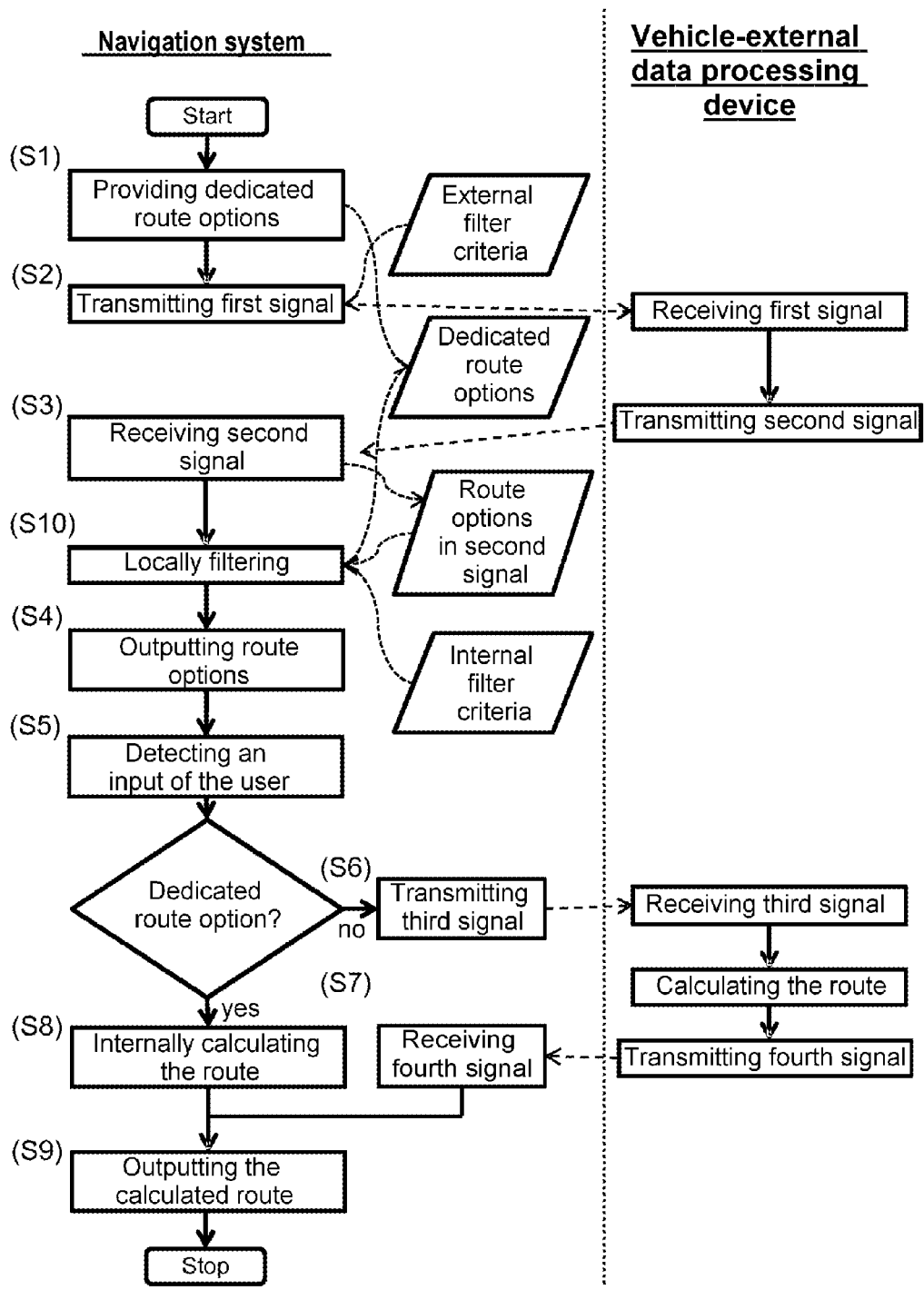
FIG. 1 shows a flow diagram for illustrating one embodiment of the method according to the invention for operating a navigation system.

FIG. 1 presents a flow diagram for illustrating one embodiment of the method according to the invention for operating a navigation system 1 of a vehicle. In this case, the navigation system 1 communicates with a vehicle-external data processing device 3. To facilitate comprehension, the method steps carried out in the vehicle-external data processing device 3 are outlined as well.

In step S1, the navigation system provides one or more dedicated route options 2. These are preferably the route options defined by the factory: "fast route", "short route" and "fuel-saving route".

In step S2, the navigation system 1 transmits a first signal m1 to the vehicle-external data processing device 3 for requesting one or more route options. In this case, an identifier of the navigation system 1, in particular an IP address of the navigation system 1, and at least one external filter criterion 8 are transmitted in order to enable a targeted response of the vehicle-external data processing device 3 or a preselection of the route options provided by the vehicle-external data processing device 3. For the external filter criterion 8, reference is made to the description regarding FIG. 2. In the case of the embodiment described here, one such external filter criterion 8 is the type of drive, that is to say for instance front-wheel, rear-wheel or all-wheel drive, of the vehicle.

Thereupon, the vehicle-external data processing device 3 receives the first signal m1 and transmits a second signal m2, in particular in a targeted manner to the navigation system 1.

In method step S3, the navigation system 1 receives the second signal m2, which identifies one or more route options 4 provided by the vehicle-external data processing device 3 for route calculation.

Step S10 involves locally filtering both the dedicated route options 2 and the route options 4 identified in the second signal m2 by means of a data processing unit 10 of the navigation system 1 on the basis of at least one internal filter criterion 9. For the internal filter criterion 9, reference is made to the description regarding FIG. 2. In the case of the embodiment described here, one such internal filter criterion 9 is the registration of the vehicle.

Step S4 involves outputting the filtered route options by means of an output unit 5 of the navigation system 1. Here in each case at least one dedicated route option 2 and at least one of the route options 4 identified in the second signal m2 are output provided that not all of the dedicated route options and/or not all of the route options identified in the second signal m2 were filtered out during the local filtering S10. Preferably, the output unit 5 can be a graphical display unit 5. Alternatively or additionally, the route options can also be output acoustically.

Step S5 thereupon involves detecting at least one input of the user of the navigation system 1 for selecting one of the route options output. Preferably, this can be carried out by detecting the touching of the graphical display unit 5, which comprises a touch-sensitive screen. In this case, that route option from among those output is selected which was output at least at the location of the touching of the touch-sensitive screen by the user.

This is followed by ascertaining whether the selected route option is a dedicated route option 2 of the navigation system 1 or one of the route options 4 identified in the second signal.

If the selected route option is one of the route options identified in the second signal, in step S6 the navigation system 1 transmits a third signal m3 to the vehicle-external data processing device 3, wherein the third signal m3 identifies the selected route option. The vehicle-external data processing device 3 receives the third signal m3, calculates a route 6 assigned to the selected route option, and transmits a fourth signal m4 to the navigation system 1. The latter receives the fourth signal m4 in step S7.

If the selected route option is a dedicated route option 2, in step S8 the navigation system 1 calculates a route 6 assigned to the selected route option.

After step S7 or S8, the calculated route 6 is output by means of the output unit 5 of the navigation system in step S9.

Figure 2:
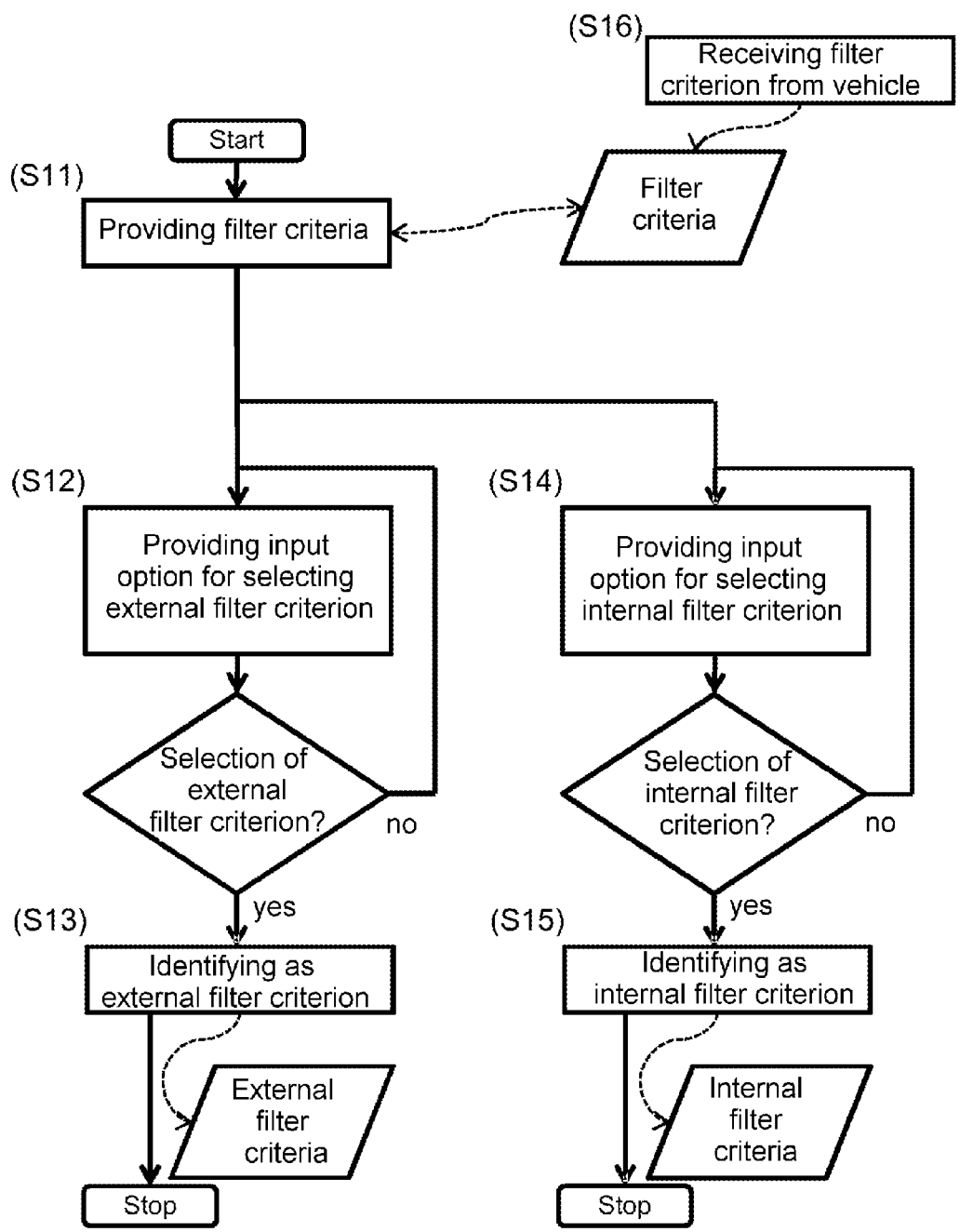
FIG. 2 shows a flow diagram for illustrating the processes of providing, selecting and identifying the filter criteria as internal or external filter criteria in the embodiment of the method according to the invention for operating a navigation system.

FIG. 2 presents a flow diagram for illustrating options of the method of providing, selecting and identifying the filter criteria as internal or external filter criteria in the embodiment of the method according to the invention for operating a navigation system.

In step S11, the navigation system 1 provides one or more predetermined filter criteria 7. In this embodiment, the predetermined filter criteria 7 are at least: the type of drive, the registration, the amount of energy available for the drive, in particular the filling level of the tank, and the number of occupants of the vehicle 1.

In this case, in step S16 the navigation system can receive the amount of energy 7 available for the drive from the vehicle 1 by means of a communication interface 11.

In step S12, the navigation system provides an input option for selection in respect of whether at least one of the predetermined filter criteria 7 is intended to be an external filter criterion 8, and detects an assigned input. If at least one of the predetermined filter criteria 7 has been selected, in step S13 this selected filter criterion is identified as an external filter criterion 8. In this regard, for instance, the type of drive of the vehicle can be identified as an external filter criterion and thus be transmitted to the vehicle-external data processing device 3 in step S2. It is then possible for the latter to provide such route options which are suitable for the respective types of drive. In this regard, for instance, a scenically beautiful route may be suitable only for a four-wheel drive.

In step S14, the navigation system provides an input option for selection in respect of whether at least one of the predetermined filter criteria 7 is intended to be an internal filter criterion 9, and detects an assigned input. If at least one of the predetermined filter criteria 7 has been selected, in step S15 this selected filter criterion is identified as an internal filter criterion 9. The registration of the vehicle 1 can be selected as such an internal filter criterion 9. This is relevant in particular if, for example on account of legal regulations for protection of the environment or for traffic calming, only vehicles having specific registrations, for instance an even or odd last digit of the registration, are permitted to drive on a specific road. In this regard, it is possible firstly to realize the filtering of the route options according to such a filter criterion, and secondly to increase protection of personal data.

Moreover, it may be desirable to use other predetermined filter criteria 7 neither as internal filter criteria 9 nor as external filter criteria 8, that is to say not to restrict the route options therewith. In this embodiment, this is the case in particular for the number of occupants and the amount of energy available for the drive.

Figure 3:
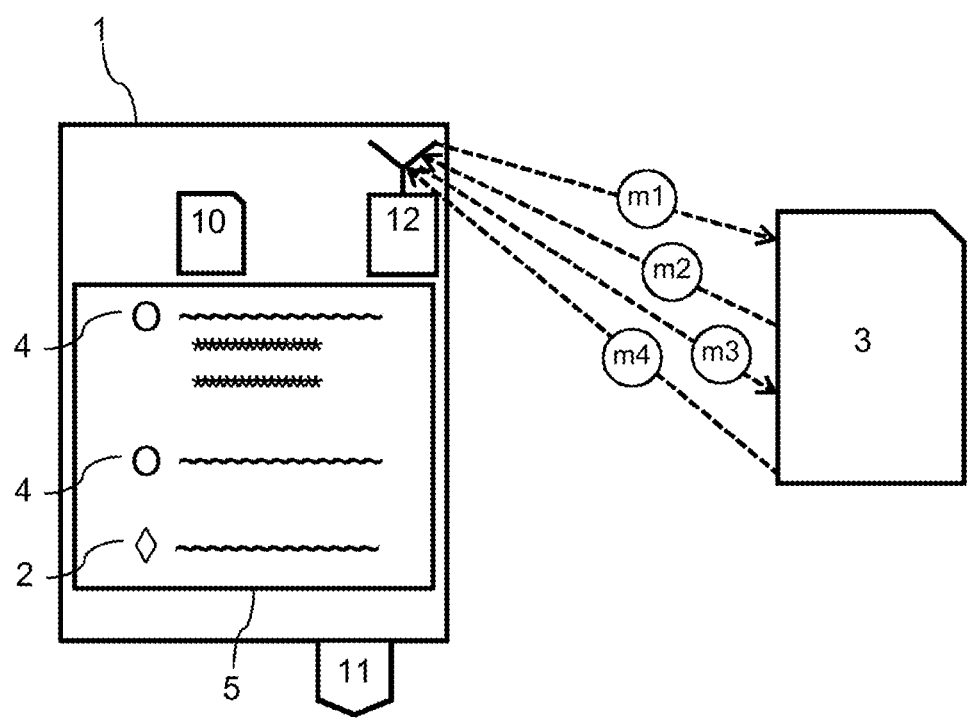
FIG. 3 schematically shows one embodiment of the navigation system according to the invention together with a vehicle-external data processing device.

FIG. 3 schematically illustrates one embodiment of the navigation system 1 according to the invention. It is configured to carry out the method for operating a navigation system in accordance with FIGS. 1 and 2, illustrated together with the vehicle-external data processing device 3. To that end, the navigation system 1 comprises an output unit 5, a data processing unit 10, a communication interface 11 for communication with the vehicle and a communication unit 12.

The communication unit 12 is configured to transmit the first signal m1 to the vehicle-external data processing device 3 and to receive the second signal m2 from the latter. Said second signal m2 transfers in each case at least one data set which is assigned to the respective route option and which has a route identifier, a route name and a route description. If the route names unambiguously assign a specific route, these can also serve as route identifier. In this case, the data set thus does not have an additional field for the route identifier. This is also possible for the route description in a similar way.

The output unit 5 is a touch-sensitive screen 5 which displays two route options 4 identified in the second signal m2 and one dedicated route option 2.

It goes without saying that even further route options 2, 4, not illustrated here, can also be considered to be output, although they cannot all be physically presented simultaneously owing to the size of the touch-sensitive screen 5. In this case, a portion of the route options can respectively be presented by means of a scrolling mechanism. Moreover, the route options 2, 4 presented may have been filtered beforehand.

FIG. 3 illustrates the visual outputting of the respective route options 2, 4, wherein the respect route name, that is to say the name or the designation of the respective route option, is presented on the touch-sensitive screen 5. In the case of the upper of the two route options 4 identified in the second signal m2, the route description of this route option is visually output in addition to the route name. In this way, the user can obtain further information about the respective route option 2, 4, for instance by selecting the respective route option 2, 4.

Finally, the communication unit 12 is configured to transmit the third signal m3 to the vehicle-external data processing device 3 and to receive the fourth signal m4 from the latter. In this case, the selected route option can be identified in the third signal m3 by means of its route identifier.

While at least one exemplary embodiment has been described above, it should be noted that a large number of variations exist in respect thereof. At the same time it should also be taken into consideration that the exemplary embodiments described merely represent non-limiting examples, and the intention is not thereby to restrict the scope, the applicability or the configuration of the devices and methods described here. Rather, the above description will provide the person skilled in the art with guidance for implementation in an exemplary embodiment thereof, wherein it goes without saying that various modifications in the functioning and the arrangement of the elements described in an exemplary embodiment can be made without in so doing departing from the subject matter respectively defined in the appended claims and the legal equivalents thereof.

LIST OF REFERENCE SIGNS

1 Navigation system
2 One or more dedicated route options
3 Vehicle-external data processing device
4 One or more route options identified in the second signal
5 Output unit of the navigation system
6 Calculated route
7 One or more predetermined filter criteria
8 One or more external filter criteria
9 One or more internal filter criteria
10 Data processing unit of the navigation system
11 Communication interface of the navigation system for communication with the vehicle
12 Communication unit of the navigation system
m1 First signal
m2 Second signal
m3 Third signal
m4 Fourth signal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a navigation system of a vehicle comprising:
   providing a first set of route options, wherein route options are constraints according to which routes may be optimized;
   transmitting a first signal requesting additional route options to a vehicle-external data processing device;
   receiving a second signal from the vehicle-external data processing device, wherein the second signal identifies a second set of route options;
   contemporaneously outputting to a user, by an output unit of the navigation system, at least one route option of the first set of route options and at least one route option of the second set of route options;
   detecting user input identifying a selected route option from among the outputted route options;
   in response to the selected route option being of the second set of route options:
      transmitting a third signal that identifies said selected route option to the vehicle-external data processing device, and
      receiving a fourth signal from the vehicle-external data processing device identifying a route assigned to the selected route option and calculated by the vehicle-external data processing device; and
   in response to the selected route option being of the first set of route options:
      calculating a route assigned to the selected route option, and
      outputting, by the output unit of the navigation system, the calculated route.

2. The method as claimed in claim 1, further comprising: providing one or more predetermined filter criteria.

3. The method as claimed in claim 2, wherein during said transmitting of the first signal, at least one of the predetermined filter criteria is transmitted to the vehicle-external data processing device to enable a pre-selection of the second set of route options.

4. The method as claimed in claim 3, further comprising:
providing an input option for selecting at least one of the predetermined filter criteria by the user and detecting an assigned input of the user; and
if at least one filter criterion has been selected, the method further comprises identifying the selected filter criterion as an external filter criterion, wherein only filter criteria identified as the external filter criteria are transmitted to the vehicle-external data processing device.

5. The method as claimed in claim 2, further comprising:
locally filtering, by a data processing unit of the navigation system, the first set of route options and/or the second set of route options based on at least one of the predetermined filter criteria, wherein only the filtered route options are output.

6. The method as claimed in claim 5, further comprising:
providing an input option for selecting at least one of the predetermined filter criteria and detecting an assigned input;
in response to at least one filter criterion being selected, identifying the selected filter criterion as an internal filter criterion, wherein said locally filtering is carried out based on the at least one filter criterion identified as the internal filter criteria.

7. The method as claimed in claim 1, wherein at least one of the predetermined filter criteria identifies a technical property of the vehicle.

8. The method as claimed in claim 2, further comprising:
receiving, by a communication interface of the navigation system, at least one of the predetermined filter criteria.

9. The method as claimed in claim 2, wherein at least one of the predetermined filter criteria is based on a use history.

10. The method as claimed in claim 9, further comprising:
providing a use history generated based on previous inputs of the user for selecting route options.

11. The method as claimed in claim 1, further comprising:
detecting at least one input of the user which indicates a confirmation or rejection of the route assigned to the selected route option; and
storing an identification in a provided use history about the confirmation or rejection of the route assigned to the selected route option.

12. The method as claimed in claim 1, further comprising:
detecting at least one input of the user which indicates a confirmation or rejection of the route assigned to the selected route option; and
in response to the selected route being of the second set of route options, transmitting a fifth signal to the vehicle-external data processing device identifying the confirmation or rejection of the route assigned to the selected route option.

13. The method as claimed in claim 1,
wherein by means of the second signal in the case of at least one of the route options provided by the vehicle-external data processing device, assigned route-related data are transferred, and
wherein during said outputting the route option, the route-related data is output at least partly by the output unit.

14. The method as claimed in claim 1, further comprising:
transmitting a further first signal to a further vehicle-external data processing device;
receiving a further second signal from the further vehicle-external data processing device, wherein the further second signal identifies a further second set of route options;
in addition to the outputted route options of the first set of route options and the second set of route options, also contemporarily outputting to the user at least one of the further second set of route options; and
in response to the selected route option being of the further second set of route options:
transmitting a further third signal to the further vehicle-external data processing device, and
receiving a further fourth signal transmitted by the further vehicle-external data processing device.

15. A computer program product for a vehicle navigation system, the computer program product comprising a non-transitory computer readable medium having stored thereon program code that, when executed, causes a processor to:
provide a first set of route options, wherein route options are constraints according to which routes may be optimized;
transmit a first signal requesting additional route options to a vehicle-external data processing device;
receive a second signal from the vehicle-external data processing device, wherein the second signal identifies a second set of route options;
contemporaneously output to a user, by an output unit of the navigation system, at least one of the first set of route options and at least one route option of the second set of route options;
detect user input identifying a selected route option from among the outputted route options;
in response to the selected route option being of the second set of route options:
transmit a third signal that identifies said selected route option to the vehicle-external data processing device, and
receive a fourth signal from the vehicle-external data processing device identifying a route assigned to the selected route option and calculated by the vehicle-external data processing device; and
in response to the selected route option being of the first set of route options:
calculate a route assigned to the selected route option, and
output, by the output unit of the navigation system, the calculated route.

16. A navigation system for a motor vehicle, comprising:
an output unit;
an input unit; and
a control unit, wherein the control unit is configured to:
provide a first set of route options, wherein route options are constraints according to which routes may be optimized;
transmit a first signal requesting additional route options to a vehicle-external data processing device;
receive a second signal from the vehicle-external data processing device, wherein the second signal identifies a second set of route options;
contemporaneously output to a user, by the output unit, at least one of the first set of route options and at least one route option of the second set of route options;
detect user input, by the input unit, identifying a selected route option from among the outputted route options;
in response to the selected route option being of the second set of route options:

transmit a third signal that identifies said selected route option to the vehicle-external data processing device, and receive a fourth signal from the vehicle-external data processing device identifying a route assigned to the selected route option and calculated by the vehicle-external data processing device; and in response to the selected route option being of the first set of route options:

calculate a route assigned to the selected route option, and output, by the output unit of the navigation system, the calculated route.

17. The navigation system as claimed in claim 16, wherein the control unit is further configured to provide one or more predetermined filter criteria.

18. The navigation system as claimed in claim 17, wherein during said transmitting of the first signal, at least one of the predetermined filter criteria is transmitted to the vehicle-external data processing device to enable a pre-selection of the second set of route options.

19. The navigation system as claimed in claim 18, wherein the control unit is further configured to:

provide an input option for selecting at least one of the predetermined filter criteria by the user and detecting an assigned input of the user; and in response to at least one filter criterion being selected, identify the selected filter criterion as an external filter criterion, wherein only filter criteria identified as the external filter criteria are transmitted to the vehicle-external data processing device.

* * * * *